(12) United States Patent
de Beus

(10) Patent No.: US 10,725,716 B1
(45) Date of Patent: Jul. 28, 2020

(54) SYSTEMS, PROCESSES, AND COMPUTER PROGRAM PRODUCTS FOR NETWORK BASED PRINTED NOTICES

(71) Applicant: KYOCERA Document Solutions Inc., Osaka (JP)

(72) Inventor: Eric de Beus, Redondo Beach, CA (US)

(73) Assignee: KYOCERA Document Solutions Inc. (JP)

( * ) Notice: Subject to any disclaimer, the term of this patent is extended or adjusted under 35 U.S.C. 154(b) by 0 days.

(21) Appl. No.: 16/417,967

(22) Filed: May 21, 2019

(51) Int. Cl.
*G06F 3/12* (2006.01)
*G06Q 20/38* (2012.01)
*G06Q 30/02* (2012.01)

(52) U.S. Cl.
CPC .......... *G06F 3/1243* (2013.01); *G06F 3/1205* (2013.01); *G06F 3/1285* (2013.01); *G06Q 20/389* (2013.01); *G06Q 30/0223* (2013.01); *G06Q 30/0276* (2013.01)

(58) Field of Classification Search
CPC .... G06F 3/1243; G06F 3/1285; G06F 3/1205; G06Q 30/0223; G06Q 20/389; G06Q 30/0276; H04N 1/342
See application file for complete search history.

(56) References Cited

U.S. PATENT DOCUMENTS

| | | | |
|---|---|---|---|
| 6,404,994 B1 | 6/2002 | Kawai et al. | |
| 6,655,284 B1 | 12/2003 | Hoshii et al. | |
| 6,913,195 B2 | 7/2005 | Shinkai | |
| 7,016,617 B2 | 3/2006 | Koike | |
| 2019/0356471 A1* | 11/2019 | Vaughn | G06F 21/64 |
| 2020/0029128 A1* | 1/2020 | Erskine | H04N 21/812 |
| 2020/0065922 A1* | 2/2020 | Goldstraj | G06N 5/04 |

\* cited by examiner

*Primary Examiner* — Kent Yip
(74) *Attorney, Agent, or Firm* — Law Office of Alexis J. Saenz

(57) ABSTRACT

A system and method provide incentives for print advertising through the use of a blockchain. Advertisers may leverage spare space on a print job by compensating a print advertiser to print an advertisement in the spare space. Embodiments may use a blockchain network to initiate requests for printed advertisements. A smart contract may include the details to be printed along with print run limits. Print services may receive requests through the blockchain and may print the advertisement on print jobs that are primarily for other information. Once the print run limits are met, confirmation of the printed advertisement may be returned through the blockchain to confirm execution of the smart contract. The print service executing the smart contract may receive authorization for compensation.

20 Claims, 4 Drawing Sheets

SYSTEMS, PROCESSES, AND COMPUTER PROGRAM PRODUCTS FOR NETWORK BASED PRINTED NOTICES

CROSS-REFERENCE TO RELATED APPLICATION

None.

FIELD

The subject disclosure relates to networks and more particularly to systems, processes, and computer program products for network based printed notices.

BACKGROUND

There are existing systems that print advertisements on pages produced by copiers or printers, in exchange for giving the copy or print customer a discount, but these systems rely on the form and content of advertisements being either stored on the device or retrieved from an advertising server, reducing the flexibility of advertising content and increasing the cost.

SUMMARY

In one aspect of the disclosure, a computer program product for generating advertisements onto printed paper is disclosed. The computer program product comprises a non-transitory computer readable storage medium having computer readable program code embodied therewith. The computer readable program code is configured, when executed by a processor, to: generate a digital smart contract comprising a set of stored rules related to conditions for payment of a printed advertisement onto paper print jobs; transmit, by a print advertiser, a request to a distributed ledger for printing of the printed advertisement, wherein the digital smart contract is included with the request; identify an execution of the conditions of the digital smart contract by a printer connected to a computer connected to the distributed ledger, wherein the execution of one of the conditions includes at least a printing of the printed advertisement onto a sheet of paper; and transmit an incentive credit to an account associated with the printer.

In another aspect of the disclosure, a computer program product for generating advertisements onto printed paper is disclosed. The computer program product comprises a non-transitory computer readable storage medium having computer readable program code embodied therewith. The computer readable program code is configured, when executed by a processor, to: generate a digital smart contract comprising a set of stored rules related to conditions for payment of a printed advertisement onto paper print jobs; post by electronic transmission, the digital smart contract into a distributed ledger; transmit, by a printer service, a request to the distributed ledger seeking print jobs; identify for the printer service, the digital smart contract; provide to the printer service, the set of stored rules related to the conditions for payment of the printed advertisement; identify an execution of the conditions of the digital smart contract by a printer of the printer service connected to a computer connected to the distributed ledger, wherein the execution of the conditions includes at least a printing of the printed advertisement onto a sheet of paper; and transmit an incentive credit to an account associated with the printer service in response to the execution of the conditions of the digital smart contract by the printer service.

In yet another aspect, a host server computer is disclosed. The host server computer comprises: a network connection; a memory storage device; and a processor coupled to the network connection and connected to the memory storage device, wherein computer executable instructions in the memory storage device configure the processor to: receive through the network connection, a generated digital smart contract comprising a set of stored rules related to conditions for payment of a printed advertisement onto paper print jobs; receive through the network connection, from a print advertiser, a request to post the digital smart contract to a distributed ledger, wherein the request includes a printing of the printed advertisement in association with the digital smart contract; identify, through the network connection, an execution of the conditions of the digital smart contract by a printer of a printer service connected to a computer connected to the distributed ledger, wherein the execution of the conditions includes at least the printing of the printed advertisement onto a sheet of paper; and transmit through the network connection, an incentive credit to an account associated with the printer.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

Figure 1:
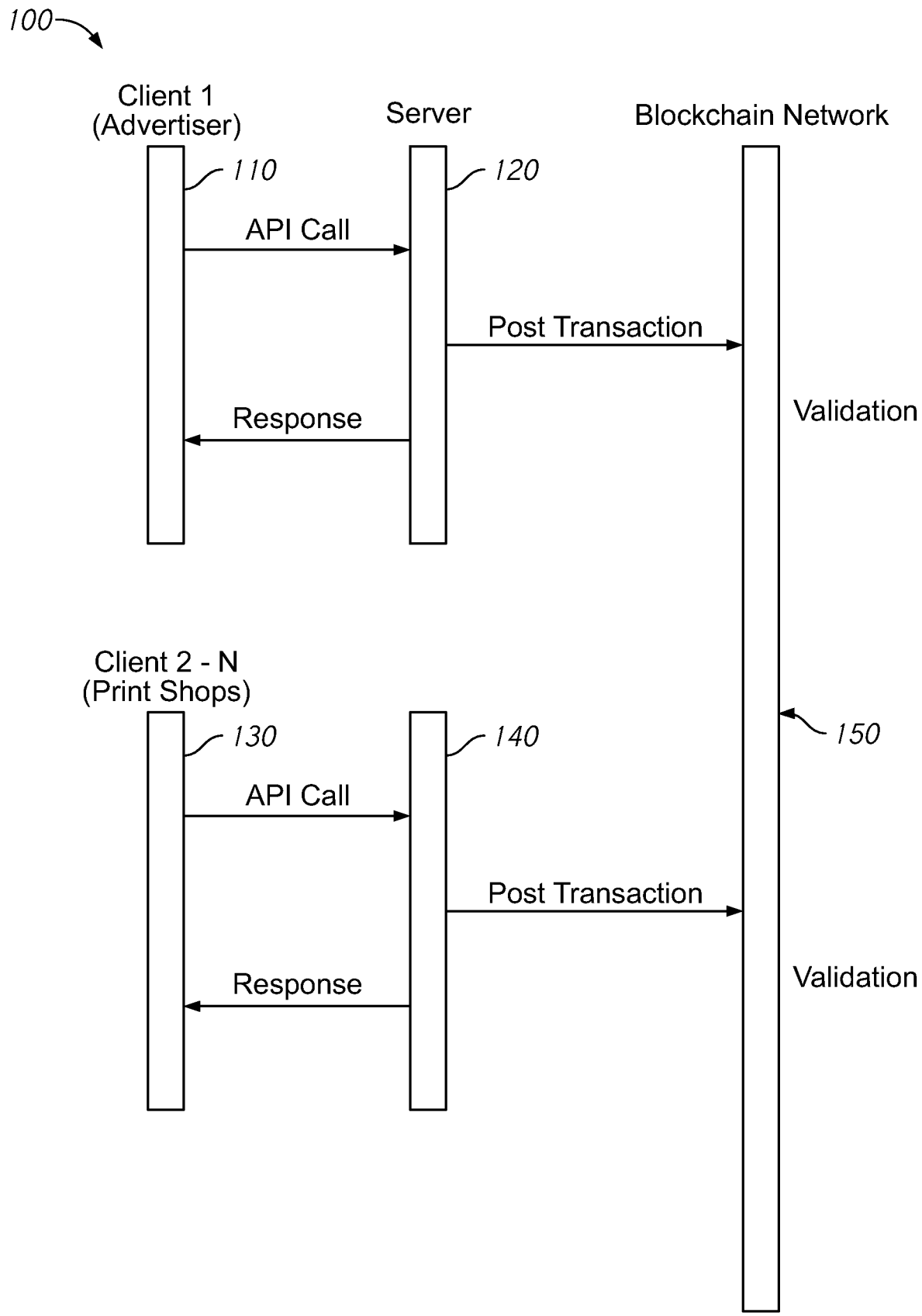
FIG. 1 is a block diagram of a system for placing advertisements using a blockchain in accordance with an embodiment of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details.

Like or similar components are labeled with identical element numbers for ease of understanding.

As will be appreciated, embodiments disclosed below may be practiced in and have industrial applicability to the general fields of printing.

In general, as used below, a "print job" may refer to a single image, a page with multiple images contained within its borders, or multiple pages with a combination of the aforementioned image(s). As "print jobs" are requested, aspects of the embodiments disclosed may compile multiple "print jobs" into a single overall "print job", "print project", or "print publication" laid out onto a sheet or series of sheets that will be assembled into an overall publication.

Generally, embodiments of the subject technology provide computer implemented methods that provide incentives for print advertising through the use of a distributed ledger network. Advertisers may leverage spare space on for example, a sheet of paper intended for a print job by compensating a print advertiser to print an advertisement in the spare space. Embodiments may use the distributed ledger network to initiate requests for printed advertisements. In an exemplary embodiment, one party may generate a smart contract which may be posted to the distributed ledger and accessed by participating parties.

A smart contract may be a digital file which may include the details to be printed along with print run criteria for eligibility and limits. The printing party may receive an incentive for including the printed advertisement on their print jobs. The digital smart contract may include a set of stored rules related to conditions for payment of the incentive after printing an advertisement onto paper print jobs. Print services may receive requests through the distributed ledger which may be in the form of a blockchain. The print service may print the advertisement on print jobs that are originally for other printed information. Once the print run limits are met by one or more printer devices, confirmation of the printed advertisement may be returned through the blockchain to confirm execution of the smart contract. The print service executing the smart contract may receive acknowledgement of fulfilling the contract by the blockchain and authorization for compensation.

In exemplary embodiments, the blockchain network supports smart contracts. Providers of advertisements can post a contract block to the blockchain offering an advertisement under specified terms. The blockchain contract provides an API identifier to retrieve advertising content and terms, and may be updated by the print shop or device when the prints are produced. Compensation (for example, payment) may be automatically made through the blockchain. As will be appreciated, these features allow advertising providers to change content easily, while eliminating costs associated with updating machines and costs associated with middlemen providing advertisement servers.

Embodiments may use a blockchain which supports a currency, or a digital token that can be exchanged for currency, and which supports smart contracts. A default blockchain account may contain an identifier and an account balance. A smart contract account may contain additional content which is similar to a computer program, with a data segment and a code segment, and which is hosted in the blockchain and can be invoked by users by posting transactions to the blockchain. The blockchain may be a public one, so anyone can see transactions that have been posted by users and validated by the blockchain network.

Referring now to FIG. 1, a system 100 for placing advertisements using a blockchain 150 is shown according to an exemplary embodiment. FIG. 1 shows a sequence diagram of contract API transactions on the blockchain type distributed ledger 150 (referred to generally as the "blockchain 150"). In general, a first user 110 (for example, a computing device operated by an advertiser) and a second user 130 (for example, a computing device operated by a print service provider such as a print shop) may connect to the blockchain 150 to transact smart contracts related to for example, printed advertisements. For sake of illustration, the devices operated by respective first and second users 110 and 130 will be understood to represent those users and will be referred to as "first user 110" and "second user 130". In addition, the second user 130 may represent the computing device connected to the server 140 and a printer device(s) connected to the computing device. While the system 100 is shown with a single first user 110 and a single second user 130, it will be understood that there may be a plurality of first users 110 and a plurality of second users 130 depending on the situation or which side of the system 100 is creating a transaction.

Transactions between the first user 110 and the blockchain 150 may occur through a server 120. Transactions between the second user 130 and the blockchain 150 may occur through a server 140.

In an exemplary embodiment, the first user 110, as an advertiser may want to post a request to the blockchain 150 for print of an advertisement on paper products (or other tangible print mediums). The printed advertisement may be printed content in addition to main printed content scheduled for print on a sheet of paper. In some embodiments, the content of the printed advertisement includes a code, address, or directions to access stored information to a product, service, or event. An example method is described below in FIG. 2.

The first user 110 may generate a smart contract through a software embodiment. The software may be available to all users participating in the blockchain 150 which may be dedicated to advertisements. The software may provide an application programming (API) interface which allows the first user 110 to create a smart contract for an advertisement. The smart contract API may support for example, two main functions: First, to post an instance of an advertisement. Second, to post printing information for the instance. Transactions with the blockchain 150 via the API may incur a small cost, for example, a cryptocurrency transaction fee.

The first user 110 (advertiser) may make a placement offer via the smart contract's first API function, entering details that will be stored in the blockchain 150 for this advertisement. Example details may include:
Contract data:
payment per print;
minimum print run;
maximum total spending;
restrictions, if any, on print shops certified to carry the advertisement;
restrictions on dates/time limits for offer availability;
account number of the advertiser in the block chain 150.
Content data:
content, or information (e.g., URL) needed to retrieve content;
minimum/maximum scaling of content allowed;
required blank space around the content.

The information may be added as a block in the blockchain 150. The first user 110 (advertiser) may receive an identifier for the transaction. The first user 110 (advertiser) may track responses to the offer by monitoring the blockchain 150. Once, the API call is posted to the blockchain 150, any participating second user 130 (subject to for example, the restrictions input by the first user 110) may receive the requested transaction.

The second user 130 (for example, a print shop), may receive the posted request from the first user as a broadcast to the blockchain 150 that may be displayed as a notification through the second user 130's API. When the second user 130 receives a transaction posted to the blockchain 150 that the first user 110 accepts, the second user 130 may execute the request. In some embodiments, acceptance of a posted request may be performed on a first come first served basis. In one embodiment, completed printing of the advertising content may be verified by the print devices being connected to a fleet service which can perform remote monitoring and logging of printer activity.

In some embodiments, the blockchain 150 may allow only one second user 130 to accept performance of the posted request from first user 110. In some embodiments, the performance of the posted transaction may be performed in parts by multiple second users 130 (for example, for a smart contract requesting one thousand instances of an advertisement, a first print shop may print out 400 instances and a second print shop may print out 600 instances). The blockchain may monitor the criteria and limits in the smart contract to close out the smart contract once limits are met (for example, a maximum spending limit or print run limit). Once a limit is met, second users 130 in process of printing the advertisement may be notified by the API so that their respective printing devices no longer print out the advertisement.

The second user(s) 130 may use the second function in the blockchain's contract API to post the details of the printing done, triggering execution of the contract code to transfer compensation (for example, payment) from the first user 110's (advertiser's) blockchain account to the print shop's blockchain account. The second user 130's API call may include information including:
Contract data:
size of print run;
number of prints done;
transformation of content performed;
account number of the print shop in the block chain.

In one embodiment, the reverse process could be used, with print shops (second users 130) posting smart contracts offering advertising space in specified print runs, and advertisers responding and paying via blockchain. An example method is described below in FIG. 3.

In operation, print shop customers may be offered discounts if they agree to have advertising content printed in suitable blank areas of their print jobs. In one embodiment, for example, print shop customers may designate certain regions of their print jobs as available to receive advertising content. These regions might not be blank; for example, the selected regions might contain default content which can be overwritten by advertising. In another embodiment, print shop customers could designate certain regions of their print jobs which should not receive advertising content, even if blank. This could be done either via a separate job ticket, or via information encoded in a bar code included in the print job; for example, a bar code that would be removed during printing.

For the following flowchart, steps of the processes may be referred to as blocks. As will be described further below, steps may be performed by a machine, for example, a computing device, an image forming apparatus, and/or a processing unit. In general, the steps may be coordinated through a server(s) connected to the blockchain. While the steps may be described in one order, it will be understood that variations to the order may be practiced or the order in which claims below are written may vary from the following without departing from the scope of the invention.

Figure 2:
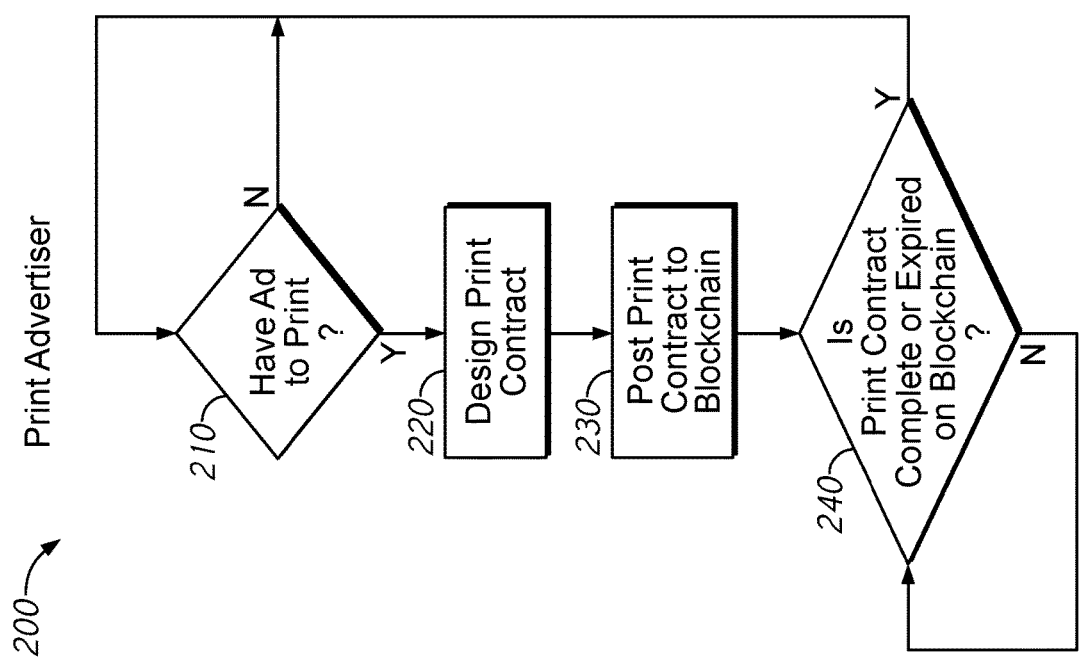
FIG. 2 is a flowchart for a method of placing advertisements by an advertiser using a blockchain in accordance with embodiments of the subject technology.

Referring now to FIG. 2, a method 200 of placing advertisements by an advertiser using a blockchain is shown according to an exemplary embodiment. The system may determine 210 whether a user has an advertisement to print. In the affirmative, the user may input 220 the elements of the smart contract, through for example, an API which may generate the smart contract once the information, criteria, and limits are submitted. The system may then post 230, the smart contract to the blockchain. The system may confirm with participating service providers their acceptance of the smart contract. In some embodiments, print devices (or a computing device connected to a print device) may automatically accept a posted smart contract if a print job in their queue meets the criteria and limits of a posted transaction. The system may monitor the blockchain until the system determines 240 whether the smart contract is fulfilled or expired.

Figure 3:
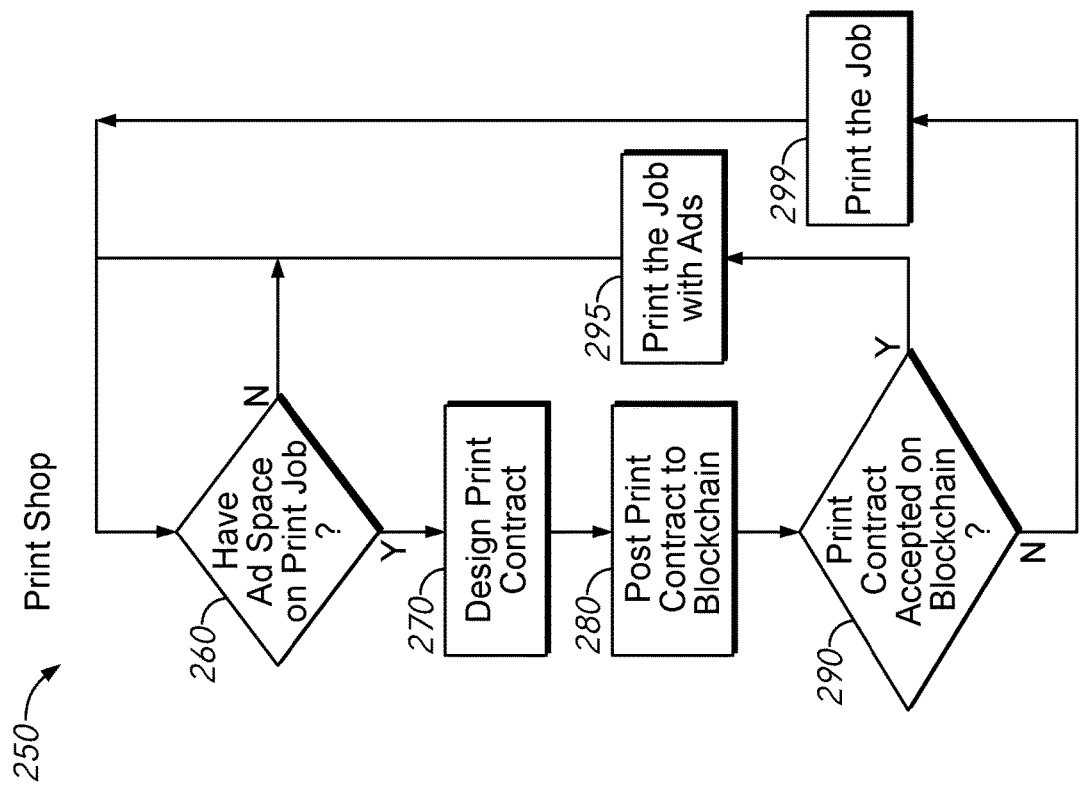
FIG. 3 is a flowchart for a method of contracting advertisements by a print service using a blockchain in accordance with embodiments of the subject technology in accordance with embodiments of the subject technology.

Referring now to FIG. 3, a method 250 of contracting advertisements by a print service using a blockchain is shown according to an exemplary embodiment. The system may determine 260 whether a user has advertising space available to print on a print job. If so, the user may generate 270 a smart contract for printing an advertisement. The smart contract may include the parameters of what kind of print space is available and for how many copies along with a requested compensation per print. The user may post 280 the smart contract to the blockchain. The system may determine 290 whether the smart contract was accepted in the blockchain. In some embodiments, the offer in the smart contract may have a time limit of acceptance, because, for example, a customer expects the print job to be performed by a specified time. If the smart contract is accepted by an advertiser, the print service may receive the advertisement information and the print job may be printed 195 with the advertisement included. Otherwise, should the smart contract expire, the print job may be printed 299 without an advertisement.

Figure 4:
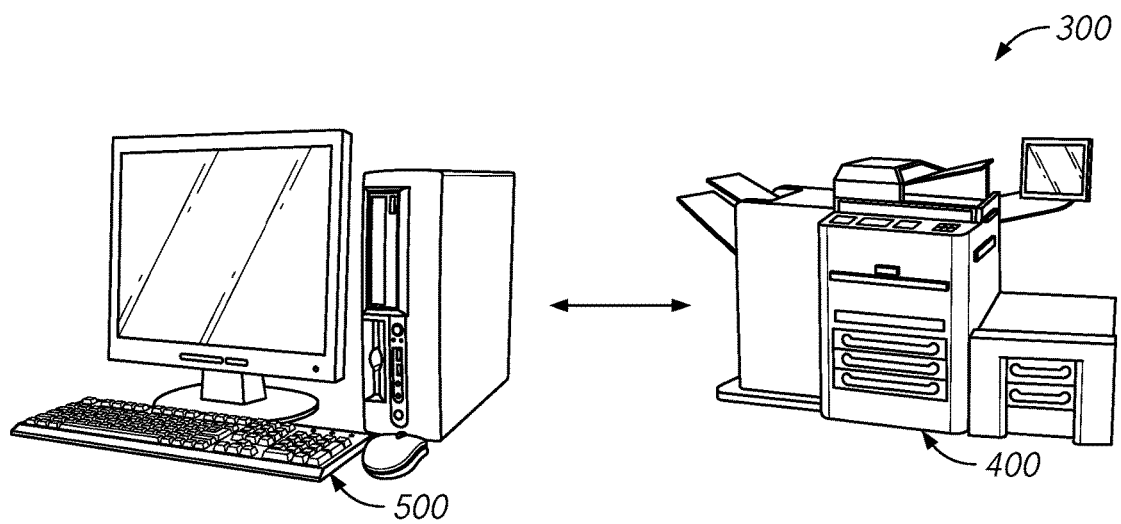
FIG. 4 is a schematic of a print job system in accordance with an embodiment of the subject technology.
Figure 5:
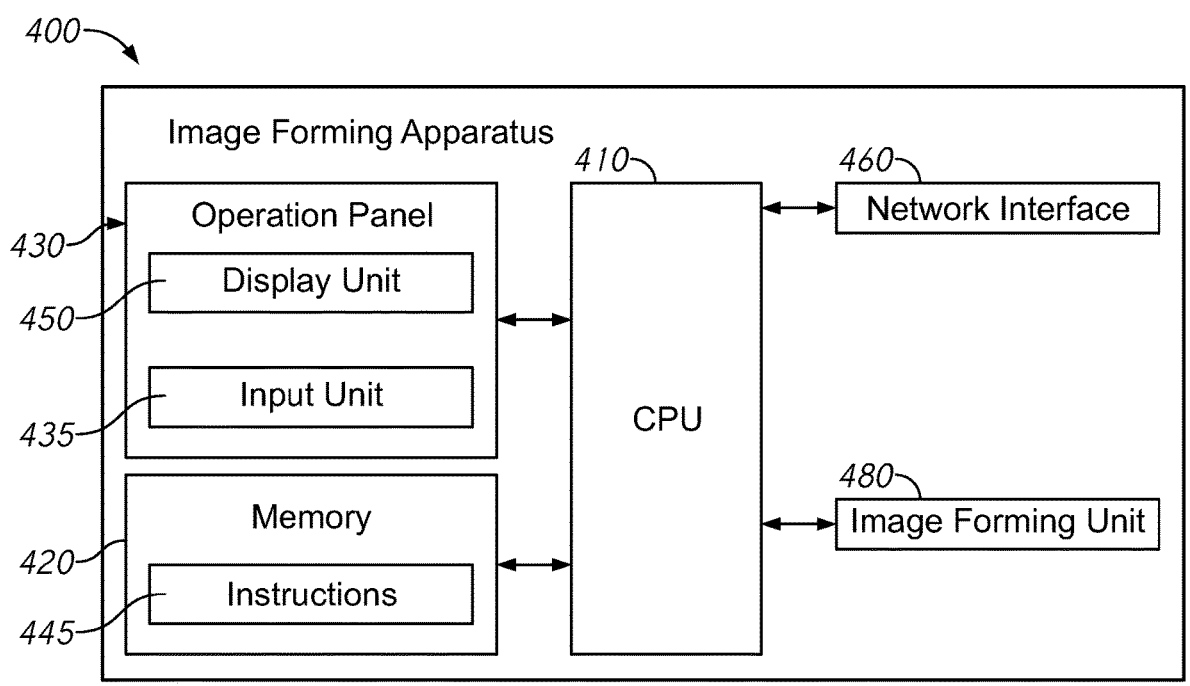
FIG. 5 is a block diagram of an image forming apparatus in accordance with an embodiment of the subject technology.
Figure 6:
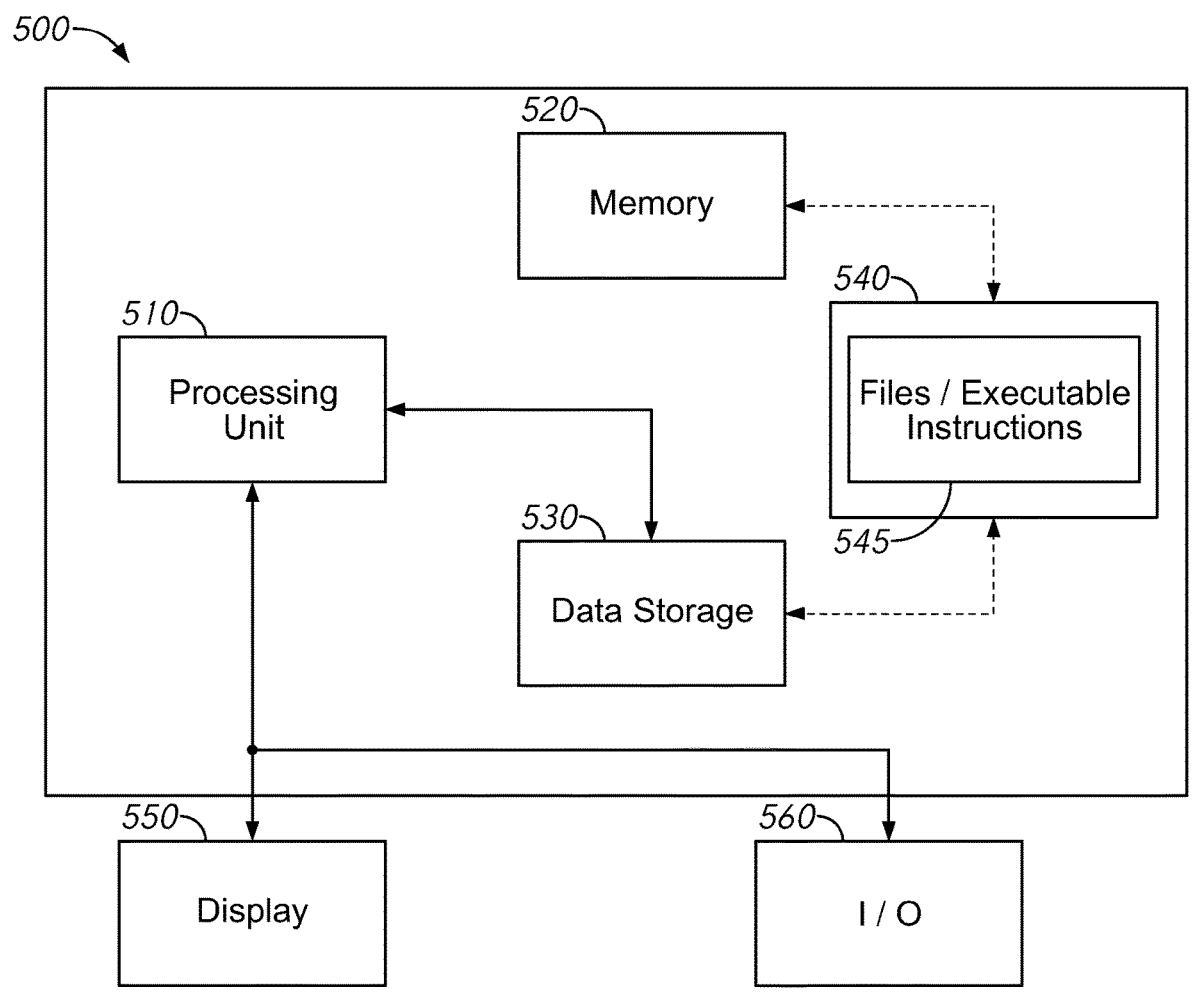
FIG. 6 is a block diagram of a computing device in accordance with an aspect of the subject technology.

Referring now to FIGS. 4-6, system and machines of the subject technology are shown according to exemplary embodiments. A system 300 is shown in FIG. 4 which may include an image forming apparatus 500 connected to a computing device 600. In some embodiments, the above described process(es) may be loaded as executable instructions into one or both of the image forming apparatus 500 and the computing device 600. FIG. 5 shows a schematic example of the image forming apparatus 500. FIG. 6 shows a schematic example of a computing device 600. In general, the process(es) above may be implemented by either or both the image forming apparatus 500 and the computing device 600. In addition, it will be understood that multiple instances of the computing device 600 may be connected to the same image forming apparatus 500, however, for sake of illustration, a single computing device 600 is shown. Likewise, as described above multiple instances of the image forming apparatus 500 may be connected to the same computing device 600. In some embodiments, the image forming apparatus 500 and/or the computing device 600 may include software embodiments, which may provide the API for generating smart contracts and posting to a blockchain according to the embodiments described above.

The image forming apparatus 500 may be for example, a computing-based image processing and printing device that can receive print job requests (for example, a printer, a fax machine, a copier machine, a multi-function printer). The components of the image forming apparatus 500, may include, but are not limited to, one or more processors or processing units 510, a system memory 520, an operation panel 530, an input unit 535, a set of program modules 545 including files and executable instructions, a display unit 550, a network interface 560, a paper cutting unit 570, an image forming unit 580, and a bus system that couples various system components including the system memory 520 to the processor(s) 510. The memory storage 520 may store for example, executable instructions and/or electronic versions of the image objects and advertisements to be printed. In some embodiments, the processors 510 may include a processing unit dedicated to graphics and image processing (for example a graphics processing unit (GPU) or visual processing unit (VPU). As a GPU or VPU, the processor 510 may implement executable instructions focused on image processing applications either alone or in coordination with other general processor 510 types such a CPUs, microchips, and the like.

The computing device 600 may be for example, a computer system or a computer server. In some embodiments, the image forming apparatus 500 may be another example of a computing device 600. As will be appreciated, some aspects of the embodiments disclosed above may turn the computing device 600 into a special purpose computer system. For example, in the role of a host server, the computing device 600 may implement for example the functions of related to posting blockchain requests and monitoring the execution of a smart contract described above. In the role of a user device, the computing device 600 is generally not a server but may instead be desktop computers, tablet or laptop computers, all-in-one computer stations, a mobile computing device (for example, a smart phone, smart wearable devices (glasses, jewelry, watches, ear wear, etc.), or programmable electronics. As an end user device, the computing device 600 may provide the API for the advertiser or for the print service to generate smart contracts and calls for a transaction.

The components of the computing device 600, may include, but are not limited to, one or more processors or processing units 610, a system memory 620, data storage 630, a computer program product 640 having a set of program modules 645 including files and executable instructions, and a bus system that couples various system components including the system memory 620 to the processor(s) 610. The memory storage 620 may store for example, electronic files of the smart contract criteria and print advertisement content. In some embodiments, the processors 610 may include a processing unit dedicated to graphics and image processing (for example a graphics processing unit (GPU) or visual processing unit (VPU). As a GPU or VPU, the processor 610 may implement executable instructions focused on image processing applications either alone or in coordination with other general processor 610 types such a CPUs, microchips, and the like.

The computing device 600 may be described in the general context of computer system executable instructions, such as the program modules 645 which represent a software embodiment of the system and processes described generally above with respect to FIGS. 2 and 3. The program modules 645 generally carry out the functions and/or methodologies of embodiments as described above. The computing device 600 may typically include a variety of computer system readable media. Such media could be chosen from any available media that is accessible by the computing device 600, including non-transitory, volatile and non-volatile media, removable and non-removable media for use by or in connection with an instruction execution system, apparatus, or device. A computer readable storage medium may be, for example, but not limited to, an electronic, magnetic, optical, electromagnetic, infrared, or semiconductor system, apparatus, or device, or any suitable combination of the foregoing. The system memory 620 could include one or more computer system readable media in the form of volatile memory, such as a random-access memory (RAM) and/or a cache memory. By way of example only, the data storage system 630 may read from and write to a non-removable, non-volatile magnetic media device. The system memory 620 may include at least one program product 640 having a set (e.g., at least one) of program modules 645 that are configured to carry out the functions of embodiments of the invention in the form of computer executable instructions. The program product/utility 640, having a set (at least one) of program modules 645, may be stored in the system memory 620 by way of example, and not limitation, as an operating system, one or more application programs, other program modules, and program data. Some embodiments may generate an electronic user interface (viewable and controllable from the display unit 550 or display 650) that may allow the user to enter smart contract information and post blockchain requests.

The computing device 600 may communicate with one or more external devices including for example, an electronic display 650 which may in some embodiments be configured for tactile response as in a touch screen display. User input into the display 650 may be registered at the processor 610 and processed accordingly. Other devices may enable the computing device 600 to communicate with one or more other computing devices, either by hardwire or wirelessly. Such communication can occur via Input/Output (I/O) interfaces/ports 660. In some embodiments, the I/O interfaces/ports 660 may be specially configured to handle aspects of the embodiments described herein converting the computing device 600 into a special purpose machine. For example, as a printer, the I/O interfaces/ports 660 may be configured to transmit messages of print job status and redirection of a print job to a print service server. The I/O interfaces/ports 660 may also include printing modules (for example, ink jet print heads, laser print systems, etc.) for rendering print jobs.

The computing device 600, through the I/O interface/ports 660, may communicate with one or more networks such as a local area network (LAN), a general wide area network (WAN), and/or a public network (e.g., the Internet) via a network adapter as is commonly known in the art. Each of the operating system, one or more application programs, other program modules, and program data or some combination thereof, may include an implementation of a networking environment. In some embodiments, the computing device 600 may be a cloud computing node connected to a cloud computing network (not shown). The computing device 600 may be practiced in distributed cloud computing environments where tasks are performed by remote processing devices that are linked through a communications network. In a distributed cloud computing environment, program modules may be located in both local and remote computer system storage media including memory storage devices. In an exemplary embodiment, the blockchain 150 described above may be one form of a distributed cloud computing environment.

As will be appreciated by one skilled in the art, aspects of the disclosed invention may be embodied as a system, method or process, or computer program product. Accordingly, aspects of the disclosed invention may take the form of an entirely hardware embodiment, an entirely software embodiment (including firmware, resident software, microcode, etc.) or an embodiment combining software and hardware aspects that may all generally be referred to herein as a "module", "circuit", or "system." Furthermore, aspects of the disclosed invention may take the form of a computer program product embodied in one or more computer readable media having computer readable program code embodied thereon. In some embodiments, the output of the computer program product provides an electronic user interface on the display 650 which may be controlled via direct contact with the display 650 or via the I/O interfaces 660 (which may be for example, interface devices such as keyboards, touchpads, a mouse, a stylus, or the like).

Aspects of the disclosed invention are described above with reference to block diagrams of methods, apparatus (systems) and computer program products according to embodiments of the invention. It will be understood that each block of the block diagrams, and combinations of blocks in the flowchart illustrations and/or block diagrams, can be implemented by computer program instructions. These computer program instructions may be provided to the processor 610 of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks in the figures.

Those of skill in the art would appreciate that various components and blocks may be arranged differently (e.g., arranged in a different order, or partitioned in a different way) all without departing from the scope of the subject technology. The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects.

Thus, the claims are not intended to be limited to the aspects shown herein, but are to be accorded the full scope consistent with the language of claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A computer program product for generating advertisements onto printed paper, the computer program product comprising a non-transitory computer readable storage medium having computer readable program code embodied therewith, the computer readable program code being configured, when executed by a computer processor, to:
   generate a digital smart contract comprising a set of stored rules related to conditions for payment of a printed advertisement onto paper print jobs;
   transmit, by a print advertiser, a request to a distributed ledger for printing of the printed advertisement, wherein the digital smart contract is included with the request;
   identify an execution of the conditions of the digital smart contract by a printer connected to a computer connected to the distributed ledger, wherein the execution of one of the conditions includes at least a printing of the printed advertisement onto a sheet of paper; and
   transmit an incentive credit to an account associated with the printer.

2. The computer program product of claim 1, wherein the printed advertisement is additional printed content to main printed content on the sheet of paper.

3. The computer program product of claim 1, wherein the set of stored rules include content of the printed advertisement.

4. The computer program product of claim 3, wherein the content of the printed advertisement includes a code, address, or directions to access stored information to a product, service, or event.

5. The computer program product of claim 1, wherein the set of stored rules include a maximum and minimum amount of scaling allowed for the printed advertisement on the sheet of paper.

6. The computer program product of claim 1, wherein the conditions for payment include a minimum print number run.

7. The computer program product of claim 1, wherein the conditions for payment further include a maximum amount of compensation for the digital smart contract.

8. A computer program product for generating advertisements onto printed paper, the computer program product comprising a non-transitory computer readable storage medium having computer readable program code embodied therewith, the computer readable program code being configured, when executed by a computer processor, to:

generate a digital smart contract comprising a set of stored rules related to conditions for payment of a printed advertisement onto paper print jobs;

post by electronic transmission, the digital smart contract into a distributed ledger;

transmit, by a printer service, a request to the distributed ledger seeking print jobs;

identify for the printer service, the digital smart contract;

provide to the printer service, the set of stored rules related to the conditions for payment of the printed advertisement;

identify an execution of the conditions of the digital smart contract by a printer of the printer service connected to a computer connected to the distributed ledger, wherein the execution of the conditions includes at least a printing of the printed advertisement onto a sheet of paper; and transmit an incentive credit to an account associated with the printer service in response to the execution of the conditions of the digital smart contract by the printer service.

9. The computer program product of claim 8, wherein the printed advertisement is additional printed content to main printed content on the sheet of paper.

10. The computer program product of claim 8, wherein the set of stored rules include content of the printed advertisement.

11. The method of claim 10, wherein the content of the printed advertisement includes a code, address, or directions to access stored information to a product, service, or event.

12. The computer program product of claim 8, wherein the set of stored rules include a maximum and minimum amount of scaling allowed for the printed advertisement on the sheet of paper.

13. The computer program product of claim 8, wherein the conditions for payment include a minimum print number run.

14. The computer program product of claim 8, wherein the conditions for payment further include a maximum amount of compensation for the digital smart contract.

15. A host server computer, comprising:
a network connection;
a memory storage device;
a processor coupled to the network connection and connected to the memory storage device, wherein computer executable instructions in the memory storage device configure the processor to:

receive through the network connection, a generated digital smart contract comprising a set of stored rules related to conditions for payment of a printed advertisement onto paper print jobs;

receive through the network connection, from a print advertiser, a request to post the digital smart contract to a distributed ledger, wherein the request includes a printing of the printed advertisement in association with the digital smart contract;

identify, through the network connection, an execution of the conditions of the digital smart contract by a printer of a printer service connected to a computer connected to the distributed ledger, wherein the execution of the conditions includes at least the printing of the printed advertisement onto a sheet of paper; and transmit through the network connection, an incentive credit to an account associated with the printer.

16. The host server computer of claim 15, wherein the printed advertisement is additional printed content to main printed content on the sheet of paper.

17. The host server computer of claim 15, wherein the set of stored rules include content of the printed advertisement.

18. The host server computer of claim 17, wherein the content of the printed advertisement includes a code, address, or directions to access stored information to a product, service, or event.

19. The host server computer of claim 15, wherein the set of stored rules include a maximum and minimum amount of scaling allowed for the printed advertisement on the sheet of paper.

20. The host server computer of claim 15, wherein the conditions for payment include a minimum print number run.

* * * * *